United States Patent
Iwasaki et al.

(10) Patent No.: US 9,322,311 B2
(45) Date of Patent: Apr. 26, 2016

(54) HONEYCOMB STRUCTURE

(71) Applicant: SUMITOMO CHEMICAL COMPANY, LIMITED, Chuo-ku, Tokyo (JP)

(72) Inventors: Kentaro Iwasaki, Wroclaw (PL); Tatsuro Kawauchi, Niihama (JP); Hajime Yoshino, Niihama (JP); Teruo Komori, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/353,787

(22) PCT Filed: Oct. 19, 2012

(86) PCT No.: PCT/JP2012/077078
§ 371 (c)(1),
(2) Date: Apr. 24, 2014

(87) PCT Pub. No.: WO2013/061872
PCT Pub. Date: May 2, 2013

(65) Prior Publication Data
US 2014/0290197 A1 Oct. 2, 2014

(30) Foreign Application Priority Data
Oct. 28, 2011 (JP) .................................. 2011-237775

(51) Int. Cl.
*B01D 50/00* (2006.01)
*B01D 39/20* (2006.01)
(Continued)

(52) U.S. Cl.
CPC ............ *F01N 3/0222* (2013.01); *B01D 46/247* (2013.01); *F01N 2260/06* (2013.01);
(Continued)

(58) Field of Classification Search
CPC ............. B01D 46/2451; B01D 46/247; B01D 2046/2481; B01D 46/2485; B01D 2046/2488
See application file for complete search history.

(56) References Cited

U.S. PATENT DOCUMENTS

2005/0076627 A1 4/2005 Itou et al.
2005/0241266 A1* 11/2005 Ichikawa .................... 52/783.1
(Continued)

FOREIGN PATENT DOCUMENTS

CN 2090425 U 12/1991
EP 2027373 2/2009
(Continued)

OTHER PUBLICATIONS

International Search Report and Written Opinion issued Nov. 13, 2012 in International Application No. PCT/JP2012/077078 dated.
(Continued)

*Primary Examiner* — Amber R Orlando
(74) *Attorney, Agent, or Firm* — Sughrue Mion, PLLC

(57) ABSTRACT

The columnar honeycomb structure 10 extending along a central axis CL, including a first end surface 10a and a second end surface 10b, and a partition wall 10c forming a plurality of first flow passages Ra and a plurality of second flow passages Rb, in which the first flow passages Ra are opened at the side of the first end surface 10a and plugged at the side of the second end surface 10b, the second flow passages Rb are plugged at the side of the first end surface 10a and opened at the side of the second end surface 10b, and the honeycomb structure includes a circular row W formed by arranging the second flow passages Rb adjoining and partitioned by the partition wall 10c in a circular pattern.

4 Claims, 8 Drawing Sheets

(51) Int. Cl.
  *B01D 39/14* (2006.01)
  *B01D 39/06* (2006.01)
  *B01D 24/00* (2006.01)
  *F01N 3/022* (2006.01)
  *B01D 46/24* (2006.01)

(52) U.S. Cl.
  CPC ......... *F01N2260/10* (2013.01); *F01N 2330/06* (2013.01); *F01N 2330/34* (2013.01); *F01N 2330/48* (2013.01); *F01N 2330/60* (2013.01); *Y02T 10/20* (2013.01)

(56) References Cited

U.S. PATENT DOCUMENTS

| | | |
|---|---|---|
| 2008/0311340 A1 | 12/2008 | Kasai et al. |
| 2009/0205301 A1 | 8/2009 | Komori et al. |
| 2010/0257830 A1 | 10/2010 | Mizutani |
| 2012/0317942 A1 | 12/2012 | Komori et al. |
| 2013/0239532 A1* | 9/2013 | Sakashita et al. ............... 55/529 |

FOREIGN PATENT DOCUMENTS

| | | |
|---|---|---|
| JP | 2001-334114 A | 12/2001 |
| JP | 2008104944 A | 5/2008 |
| JP | 2008-212787 A | 9/2008 |
| JP | 2009-154124 A | 7/2009 |
| JP | 2009-202143 A | 9/2009 |
| WO | 9909306 A1 | 2/1999 |
| WO | 2007/074808 A1 | 5/2007 |
| WO | 2008066795 A2 | 6/2008 |
| WO | 2011/090015 A1 | 7/2011 |

OTHER PUBLICATIONS

First Office Action issued Jan. 7, 2015 in counterpart Chinese Patent Application No. 201280052972.4 with translation.
Communication dated Aug. 4, 2015, issued by the Japan Patent Office in corresponding Japanese Application No. 2011-237775.
Communication dated Jun. 22, 2015 from the European Patent Office issued in corresponding European application No. 12843713.4.
Communication dated Nov. 10, 2015 from the State Intellectual Property Office of the P.R.C. in counterpart application No. 201280052972.4.
Notice of Reasons for Rejection issued Mar. 8, 2016 in counterpart Japanese Patent Application No. P2011-237775 with English translation.

* cited by examiner

Fig.4
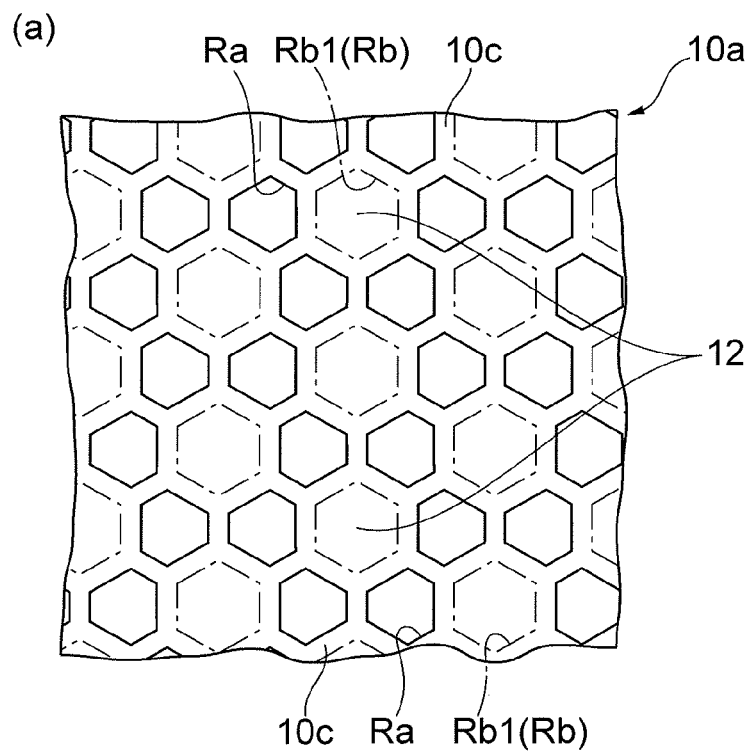
(a)
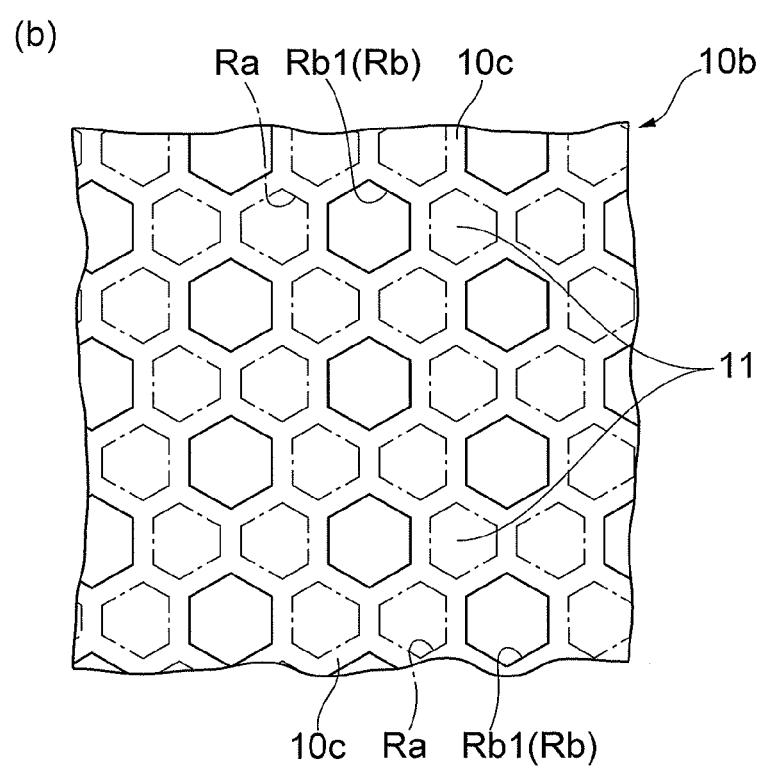
(b)

HONEYCOMB STRUCTURE

CROSS REFERENCE TO RELATED APPLICATIONS

This application is a National Stage of International Application No. PCT/JP2012/077078, filed Oct. 19, 2012, claiming priority from Japanese Patent Application No. 2011-237775, filed Oct. 28, 2011, the contents of all of which are incorporated herein by reference in their entirety.

TECHNICAL FIELD

The present invention relates to a honeycomb structure used as a filter for purifying gas.

BACKGROUND ART

A honeycomb structure is widely used as a filter for purifying exhaust gas of an internal combustion engine, such as a diesel particulate filter (for example, refer to Patent Literature 1). Since soot removed from exhaust gas deposits in a honeycomb structure, filter regeneration needs to be performed by burning the soot every certain period of time. In order to burn the soot, it is necessary simply to light the soot by supplying large amounts of combustion exhaust gas at high-temperature and burn out the soot.

The honeycomb structure may be broken by combustion heat of the soot during the filter regeneration, and thus, the honeycomb structure is required to have high thermal shock resistance. Patent Literature 1 describes, in a honeycomb structure having a structure in which a plurality of segment parts is connected by a connection part, the honeycomb structure whose thermal shock resistance is increased by adjusting strength of the connection part.

CITATION LIST

Patent Literature

Patent Literature 1: Japanese Patent Application Laid-Open Publication No. 2009-202143

SUMMARY OF INVENTION

Technical Problem

The present inventors repeated experiments on a honeycomb structure, and found circumstances where a plurality of radial cracks was generated in a gas-flow downstream end surface of the honeycomb structure in a thermal shock resistance test, and under harsher conditions, these cracks were enlarged and connected to each other, and finally a circular crack was formed. Thus, measures to avoid decrease in filter performance due to generation of the radial cracks are required to be performed.

The present invention has been made in view of the above-described subject, and it is an object of the present invention to provide a honeycomb structure capable of suppressing decrease in filter performance due to generation of a circular crack and capable of suppressing enlargement of the circular crack.

Solution to Problem

In order to solve the above-described subject, the present invention is a columnar honeycomb structure extending along a central axis, including a first end surface and a second end surface which are opposed to each other in an extending direction of the central axis, and a partition wall forming a plurality of first flow passages and a plurality of second flow passages which extend along the central axis, in which the first flow passages are opened at the side of the first end surface and plugged at the side of the second end surface, the second flow passages are plugged at the side of the first end surface and opened at the side of the second end surface, the opening ratio of the first end surface is larger than the opening ratio of the second end surface, and the honeycomb structure includes a circular row formed by arranging the second flow passages adjoining and partitioned by the partition wall in a circular pattern when viewed from the extending direction of the central axis.

According to the above-described honeycomb structure, since the circular row formed by arranging the second flow passages, which are opened at the side of the second end surface which is downstream for gas flow, is included, even if thermal shock of more than acceptable amount of the honeycomb structure is applied during filter regeneration, at the side of the second end surface, not the plugged part or the partition wall in a part other than the circular row but the partition wall between the second flow passages in the circular row can be induced to be destroyed so that a circular crack is generated. In addition, in the above-described honeycomb structure, since the side of the first end surface of the circular row is completely plugged, if the circular crack is generated at the side of the second end surface of the circular row and the second flow passages are communicated therebetween, soot leakage does not occur. Therefore, according to the above-described honeycomb structure, decrease in filter performance due to generation of the circular crack can be suppressed. Moreover, by permitting the generation of the circular crack in the circular row, stress to be applied by subsequent thermal shock is dispersed, and therefore, enlargement of the circular crack can be suppressed. Furthermore, according to this honeycomb structure, generation of the circular crack can be induced by devising a plugging pattern of the flow passages without additionally providing a low-strength member like a conventional honeycomb structure, and therefore, configurational simplification and cost reduction of the honeycomb structure can be achieved.

The above-described circular row may be formed so as to surround the central axis of the columnar honeycomb structure.

According to this configuration, since the circular row at the side of the second end surface can effectively receive stress for generating the circular crack caused by thermal shock, generation of the circular crack can be induced more reliably.

The above-described honeycomb structure may include a plurality of circular rows which are adjacent to each other in parallel across the partition wall.

According to this configuration, since a plurality of circular rows are arranged in parallel each other, the strength of the circular rows at the side of the second end surface can be made further lower than that of any other region, and generation of the circular crack can be induced more reliably.

Regarding the above-described honeycomb structure, in the cross-section perpendicular to the central axis, the average of the opening area of the second flow passages forming the circular row may be larger than the average of the opening area of the second flow passages not forming the circular row.

According to this configuration, in the cross-section perpendicular to the central axis, the average of the opening area of the second flow passages forming the circular row is larger than the average of the opening area of the second flow passages not forming the circular row, and therefore, the strength of the flow passage rows at the side of the second end surface can be further lower than that of any other region, and generation of the circular crack can be induced more reliably.

Advantageous Effects of Invention

According to the present invention, decrease in filter performance due to generation of a circular crack can be suppressed, and enlargement of the circular crack can also be suppressed.

BRIEF DESCRIPTION OF DRAWINGS

FIG. 4 (a) is an enlarged view showing a part of a first end surface of the honeycomb structure,
and FIG. 4(b) is an enlarged view showing a part of a second end surface of the honeycomb structure.

DESCRIPTION OF EMBODIMENTS

Hereinafter, preferred embodiments of the present invention will be described in detail with reference to the drawings.

First Embodiment

Figure 1:
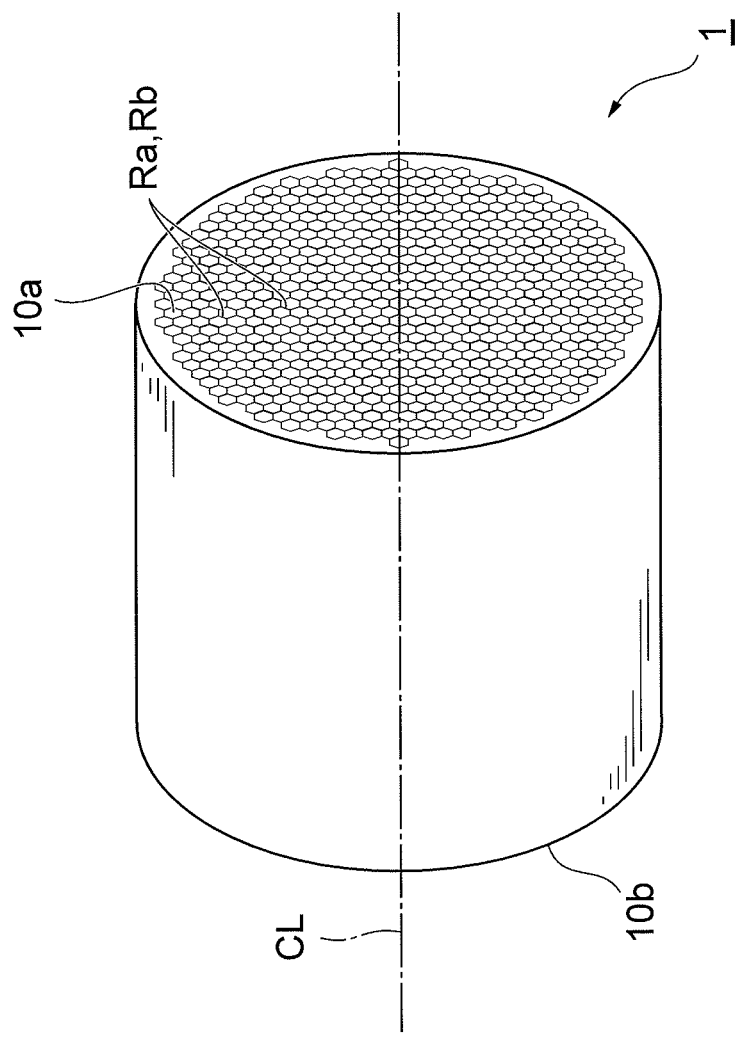
FIG. 1 is a perspective view showing a honeycomb structure according to a first embodiment.

As shown in FIG. 1, a honeycomb structure 10 according to the first embodiment is a cylindrical structure that is attached to a diesel particulate filter or the like and used as a filter for purifying exhaust gas of an internal combustion engine. The cylindrical honeycomb structure 10 extends along a central axis CL. Hereinafter, the extending direction of the central axis CL will be referred to as a central axis direction.

The honeycomb structure 10 includes a first end surface 10a and a second end surface 10b which are opposed to each other in the central axis direction, and a partition wall 10c forming a plurality of first flow passages Ra and a plurality of second flow passages Rb which extend along the central axis CL.

The honeycomb structure 10 is formed of a porous (for example, average pore diameter of 20 μm or less) ceramic material or the like. Examples of the ceramic material used for the honeycomb structure 10 include oxides such as alumina, silica, mullite, cordierite, glass, and aluminum titanate, silicon carbide, silicon nitride, and metals. Aluminum titanate may further contain magnesium and/or silicon.

The foregoing honeycomb structure 10 can be obtained by calcining a green formed body (uncalcined formed body) that is to be the above-described ceramic material and performing predetermined plugging treatment with respect to the respective flow passages Ra, Rb. The green formed body contains inorganic compound source powder that is a ceramic raw material, an organic binder such as methyl cellulose, and an additive agent that is added as needed.

For example, in the case of an aluminum titanate green formed body, the inorganic compound source powder contains aluminum source powder such as α-alumina powder, and titanium source powder such as anatase-type or rutile-type titania powder, and may further contain magnesium source powder such as magnesia powder and magnesia spinel powder, and/or silicon source powder such as silicon oxide powder and glass frit as needed.

Examples of the organic binder include celluloses such as methylcellulose, carboxymethylcellulose, hydroxyalkylmethylcellulose, and sodium carboxymethylcellulose; alcohols such as polyvinyl alcohol; and lignosulfonate.

Examples of the additive agent include a pore-forming agent, a lubricant, a plasticizer, a dispersant, and a solvent.

Examples of the pore-forming agent include carbon materials such as graphite; resins such as polyethylene, polypropylene, and polymethylmethacrylate; vegetable materials such as starch, a nut shell, a walnut shell, and corn; ice; and dry ice.

Examples of the lubricant and the plasticizer include alcohols such as glycerin; higher fatty acids such as caprylic acid, lauric acid, palmitic acid, arachidic acid, oleic acid, and stearic acid; metal stearate such as Al stearate, and polyoxyalkylene alkylether (POAAE).

Examples of the dispersant include inorganic acids such as nitric acid, hydrochloric acid, and sulfuric acid; organic acids such as oxalic acid, citric acid, acetic acid, malic acid, and lactic acid; alcohols such as methanol, ethanol, and propanol; and a surfactant such as polycarboxylic acid ammonium.

As the solvent, for example, alcohols such as methanol, ethanol, butanol, and propanol; glycols such as propylene glycol, polypropylene glycol, and ethylene glycol; water and the like can be used.

Figure 2:
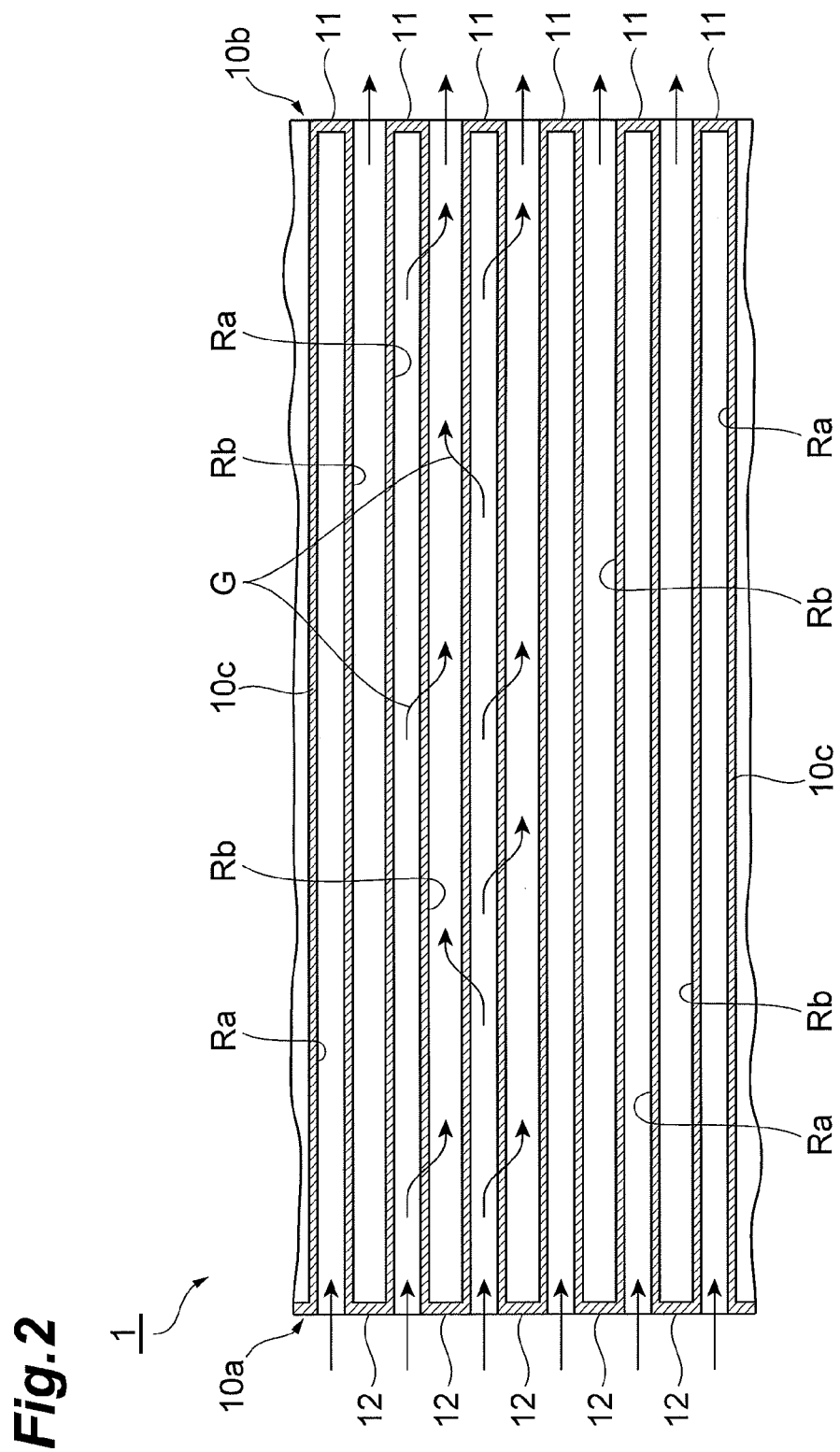
FIG. 2 is an enlarged view showing a part of a cross-section along a central axis of the honeycomb structure.

FIG. 2 is an enlarged view showing a part of a cross-section along the central axis CL of FIG. 1. As shown in FIG. 2, the flow passages Ra, Rb of the honeycomb structure 10 are plugged at either one of the side of the first end surface 10a and the side of the second end surface 10b. Specifically, the first flow passages Ra are opened at the side of the first end surface 10a and plugged at the side of the second end surface 10b by a plugging material 11. Moreover, the second flow passages Rb are opened at the side of the second end surface 10b and plugged at the side of the first end surface 10a by a plugging material 12.

For materials of the plugging materials 11, 12, the same material as the above-described green formed body may be used, or a different material may be used. Moreover, for the materials of the plugging materials 11, 12, a material that does not allow the exhaust gas of the internal combustion engine to pass therethrough may be used.

The honeycomb structure 10 includes the partition wall 10c forming a plurality of first flow passages Ra and a plurality of second flow passages Rb. In other words, each of the flow passages Ra, Rb is separated by the partition wall 10c. The partition wall 10c extends from the first end surface 10a to the second end surface 10b along the central axis CL.

The honeycomb structure 10 shown in FIG. 2 is arranged in an exhaust gas flow passage of the internal combustion engine such that the first end surface 10a is upstream for gas flow (nearer to the internal combustion engine) and the second end surface 10b is downstream for gas flow. The main flow of the exhaust gas that passes through the honeycomb structure 10 is indicated as the arrow G.

As indicated by the arrow G, the exhaust gas of the internal combustion engine first flows into the flow passage Ra from an opening at the side of the first end surface 10a. Since the side of the second end surface 10b of the first flow passage Ra is plugged, the gas that has flowed into the first flow passage Ra passes through the partition wall 10c and flows into the second flow passage Rb. When the gas passes through the partition wall 10c, soot or the like in the gas is trapped. The gas that has flowed into the second flow passage Rb flows out of the honeycomb structure 10 through an opening at the side of the second end surface 10b. Accordingly, the purified gas is discharged from the side of the second end surface 10b of the honeycomb structure 10.

Figure 3:
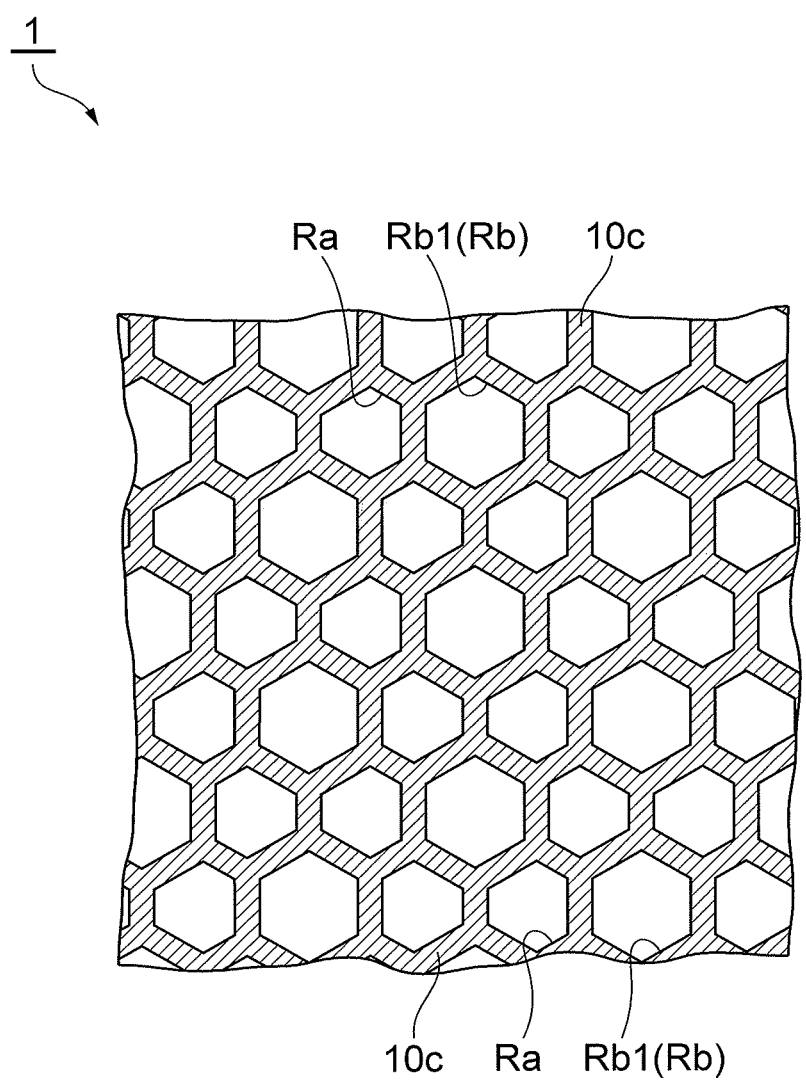
FIG. 3 is an enlarged view showing a part of a cross-section perpendicular to the central axis of the honeycomb structure.

Next, the cross-sectional shapes of the first flow passage Ra and the second flow passage Rb will be described. FIG. 3 is an enlarged view showing a part of a cross-section perpendicular to the central axis CL of the honeycomb structure 10. FIG. 4(a) is an enlarged view showing a part of the first end surface 10a of the honeycomb structure 10, and FIG. 4(b) is an enlarged view showing a part of the second end surface 10b.

As shown in FIG. 3 and FIG. 4, the cross-section perpendicular to the central axis CL of the honeycomb structure 10 has a lattice structure that forms the flow passages Ra, Rb into a hexagonal shape by the partition wall 10c. The foregoing shape of the honeycomb structure 10 is formed by integral extrusion except for the plugging materials 11, 12, and the flow passages Ra, Rb extend in the central axis direction while keeping a constant cross-sectional shape without being deformed during the process.

Examples of the cross-sectional shapes of the first flow passages Ra and the second flow passages Rb include a regular hexagonal shape and an orderly hexagonal shape (for example, a hexagonal shape composed of a long side having the same length with one side of the adjacent regular hexagonal shape in the flow passage cross-section and a short side that is shorter in length than the long side). That is, the honeycomb structure 10 has an asymmetry cell structure (asymmetry lattice structure) with flow passages having different cross-sectional shapes.

Specifically, the first flow passages Ra have the orderly hexagonal cross-sectional shape. In contrast, the second flow passages Rb are divided into two types of flow passages Rb1, Rb2 having different cross-sectional shapes. The second flow passages Rb1 have the regular hexagonal cross-sectional shape, and the second flow passages Rb2 have the orderly hexagonal cross-sectional shape that is the same with the first flow passages Ra. It is to be noted that the second flow passages Rb2 are not shown in FIG. 3 and FIG. 4.

In the cross-section perpendicular to the central axis CL of the honeycomb structure 10, the first flow passages Ra (and second flow passages Rb2) having the orderly hexagonal cross-sectional shape are arranged so as to surround the flow passages Rb1 having the regular hexagonal cross-sectional shape. In the honeycomb structure 10, the first flow passages Ra are formed more than the second flow passages Rb in number by the foregoing arrangement. Thus, the opening ratio in the first end surface 10a (the ratio of the opening area of the first flow passages Ra to the total area of the first end surface 10a) is larger than the opening ratio in the second end surface 10b (the ratio of the opening area of the second flow passages Rb to the total area of the second end surface 10b). In this manner, by making the opening ratio in the first end surface 10a at the gas upstream side larger, generation of pressure loss of the exhaust gas in the honeycomb structure 10 can be suppressed.

Figure 5:
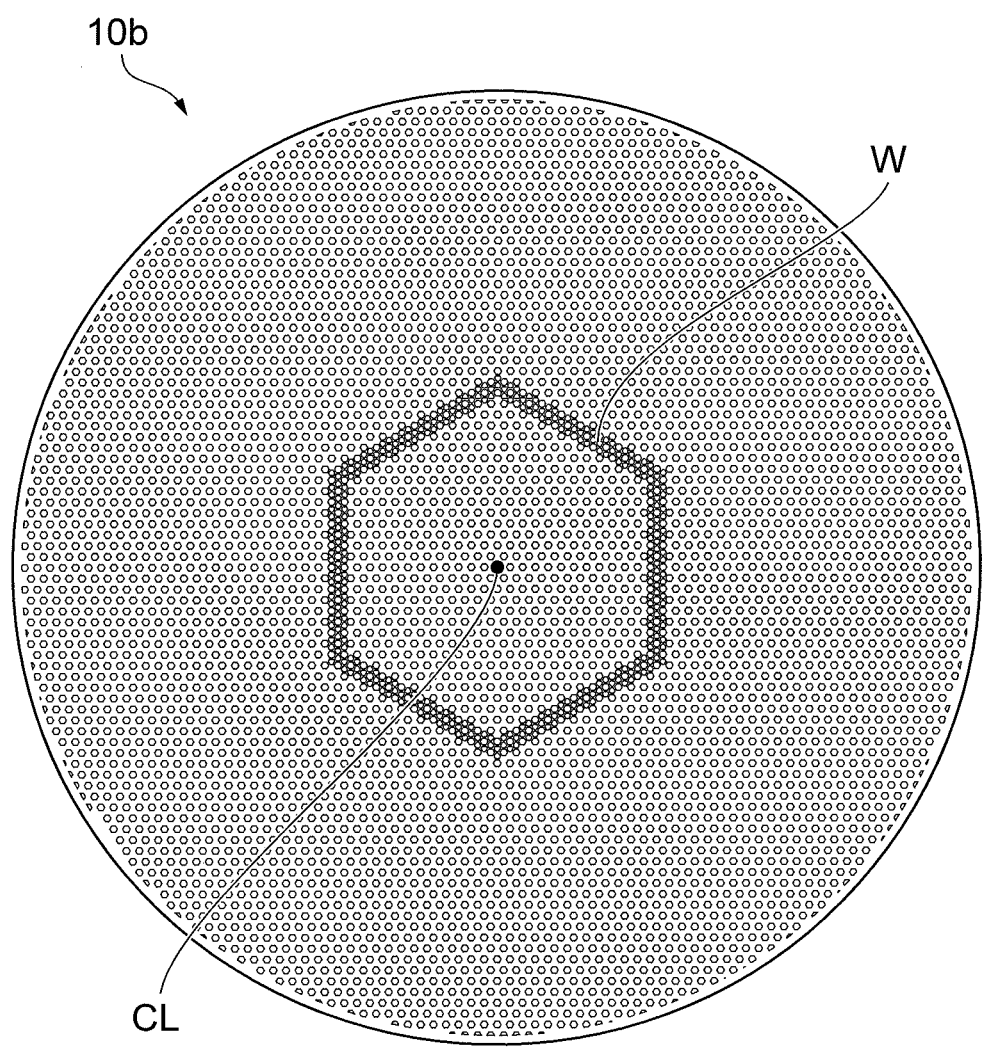
FIG. 5 is an overall view showing the second end surface of the honeycomb structure.
Figure 6:
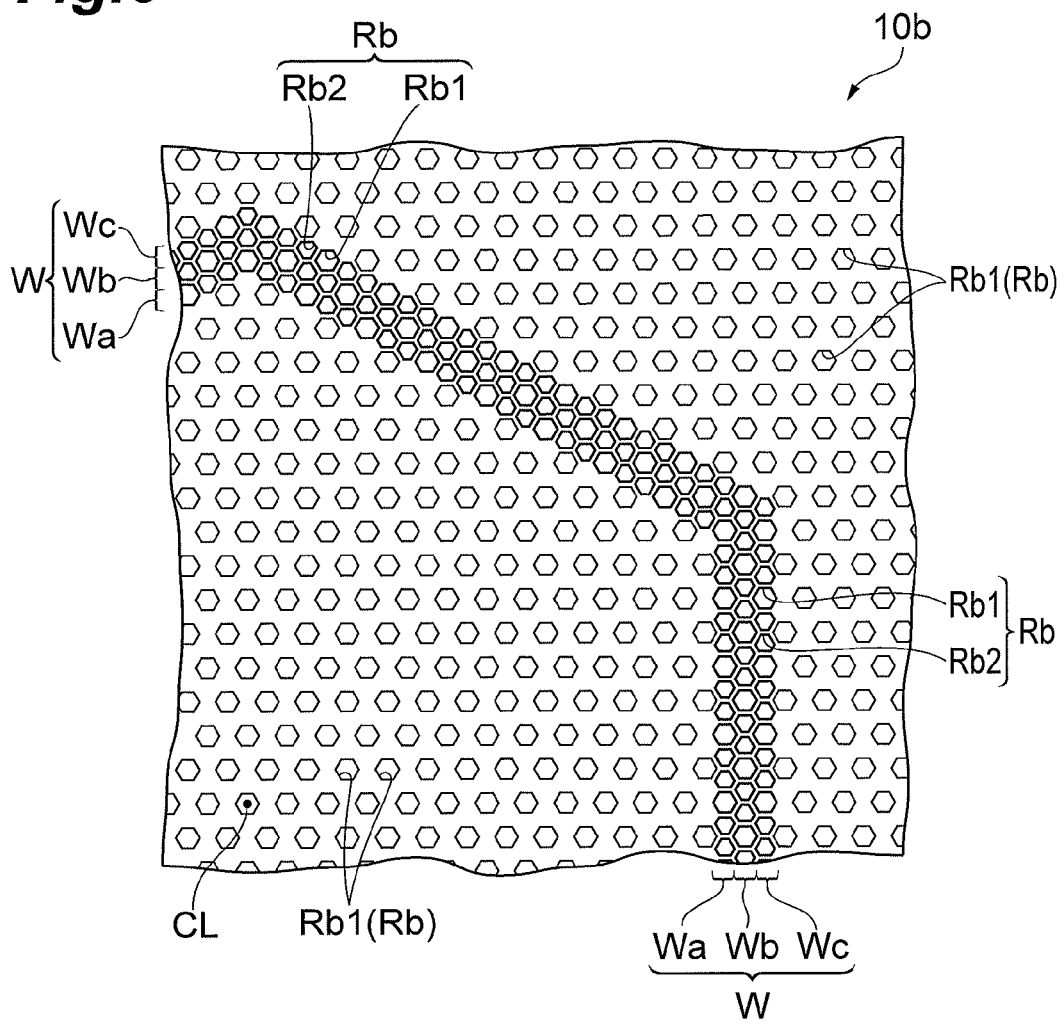
FIG. 6 is a partial enlarged view of FIG. 5.

Next, a circular row W included in the honeycomb structure 10 will be described. FIG. 5 is an overall view showing the second end surface 10b, and FIG. 6 is a partial enlarged view of FIG. 5. As shown in FIG. 5 and FIG. 6, the honeycomb structure 10 includes the circular row W that forms a circular shape (regular hexagonal shape) when viewed from the central axis direction. The circular row W is formed so as to surround the central axis CL as the center. It is to be noted that the shape of the circular row W is not necessarily required to be a regular hexagonal shape. For example, it may be a circle, other polygons such as a tetragon, or the like insofar as it is a closed ring shape formed by combining straight lines and curved lines.

The circular row W is composed of the second flow passages Rb1 having the regular hexagonal cross-sectional shape and the second flow passages Rb2 having the orderly hexagonal cross-sectional shape. The circular row W is formed by arranging the second flow passages Rb1, Rb2 adjoining and partitioned by the partition wall 10c in a circular pattern (regular hexagonal pattern). According to such a configuration, in the circular row W, a part having higher opening ratio and weaker strength compared to a part of the second end surface 10b other than the circular row W (a part as shown in FIG. 4(b)) can be intentionally provided.

As shown in FIG. 6, the circular row W of the honeycomb structure 10 according to the first embodiment can be divided into single-row (a row having a width of one flow passage) circular rows Wa, Wb, Wc. In other words, the circular row W is composed of the parallel circular rows Wa, Wb, Wc. In this manner, by constituting the circular row W with a plurality of circular rows Wa, Wb, Wc, strength can be further decreased.

According to the above-described honeycomb structure 10 according to the first embodiment, since the circular row W formed by arranging the second flow passages Rb, which are opened at the side of the second end surface 10b which is downstream for gas flow, is included, even if thermal shock of more than acceptable amount of the honeycomb structure 10 is applied during filter regeneration, at the side of the second end surface 10b, not the plugged part or the partition wall in a part other than the circular row W but the partition wall between the second flow passages Rb in the circular row W can be induced to be destroyed first so that a circular crack is generated. In addition, in the honeycomb structure 10, since the side of the first end surface 10a of the circular row W is completely plugged, if the circular crack is generated at the side of the second end surface 10b of the circular row W and the second flow passages Rb1, Rb2 are communicated therebetween, soot leakage does not occur. Therefore, according to the honeycomb structure 10, decrease in filter performance due to generation of the circular crack can be suppressed.

Moreover, in the honeycomb structure 10, by permitting the generation of the circular crack in the circular row W, stress to be applied by subsequent thermal shock can be dispersed, and therefore, enlargement of the circular crack can be suppressed. Furthermore, according to the honeycomb structure 10, generation of the circular crack can be induced by devising a plugging pattern of the flow passages without additionally providing a low-strength member like a conventional honeycomb structure, and therefore, configurational simplification and cost reduction of the honeycomb structure can be achieved.

Moreover, since the honeycomb structure 10 includes a plurality of circular rows Wa, Wb, Wc which are adjacent to each other in parallel across the partition wall 10c, a circular region having low strength can be intentionally formed at the side of the second end surface 10b, and generation of the circular crack can be induced more reliably.

Furthermore, since the circular row W is formed so as to surround the central axis CL in the honeycomb structure 10, the circular row W at the side of the second end surface 10b can effectively receive stress for generating the circular crack caused by thermal shock, and generation of the circular crack can be induced more reliably.

Moreover, in the honeycomb structure 10, by adopting the asymmetry cell structure shown in FIG. 3, a filter area per filter unit volume can be made larger compared to a symmetry cell structure, and thus, pressure loss due to the filter can be decreased, and fuel consumption of an internal combustion engine in which the honeycomb structure 10 is applied can be improved.

Second Embodiment

A honeycomb structure 20 according to the second embodiment is different from the honeycomb structure 10 according to the first embodiment in that a first circular row W1, a second circular row W2, and radial flow passage rows W3 are formed and second flow passages Rb3 are included. It is to be noted that parts corresponding to those in the first embodiment are denoted by the corresponding reference numerals and duplicate explanation is omitted.

Figure 7:
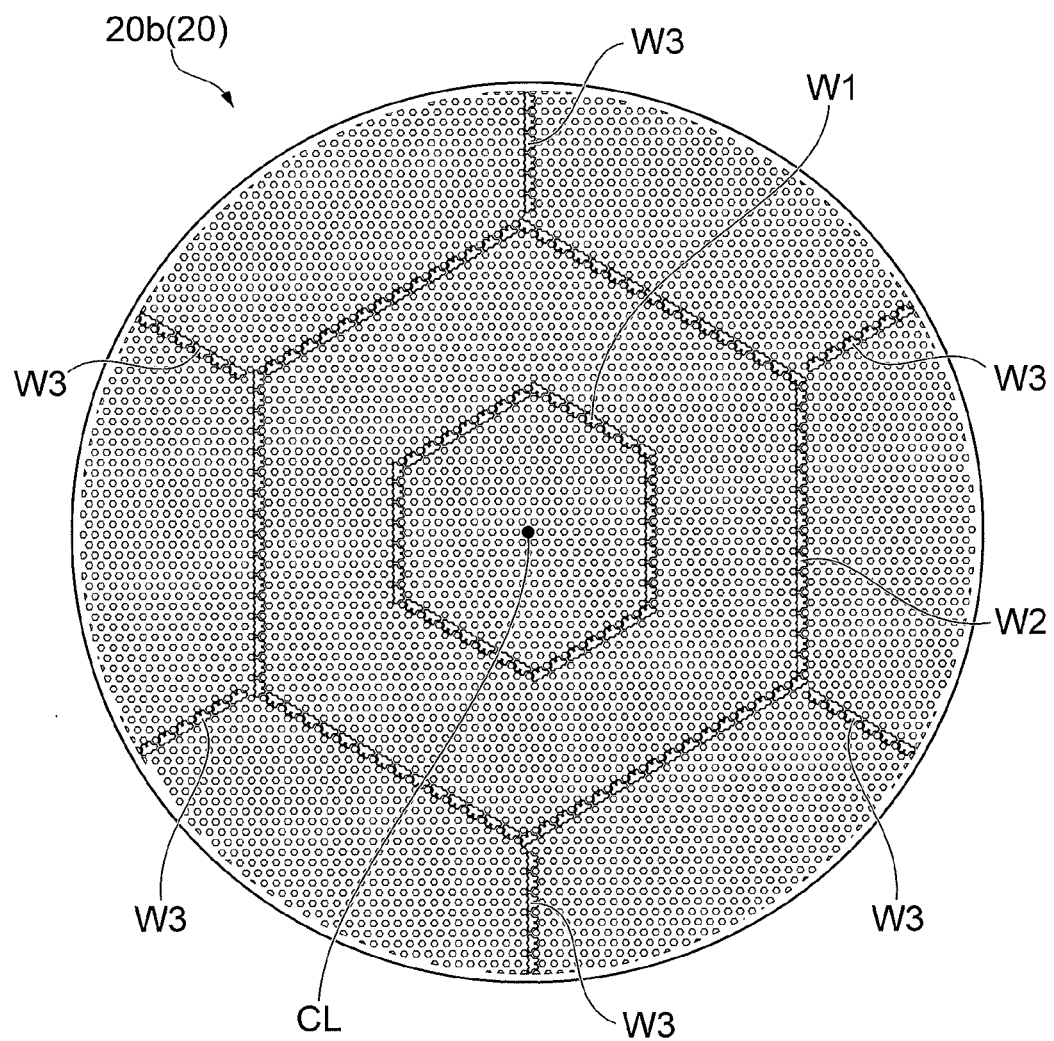
FIG. 7 is an overall view showing a second end surface of a honeycomb structure according to a second embodiment.

FIG. 7 is an overall view showing a second end surface 20b of the honeycomb structure 20 according to the second embodiment. As shown in FIG. 7, the honeycomb structure 20 according to the second embodiment includes two circular rows W1, W2. The circular rows W1, W2 are formed into a regular hexagonal shape so as to surround the central axis CL as the center. The first circular row W1 is formed at the inner side than the second circular row W2.

Figure 8:
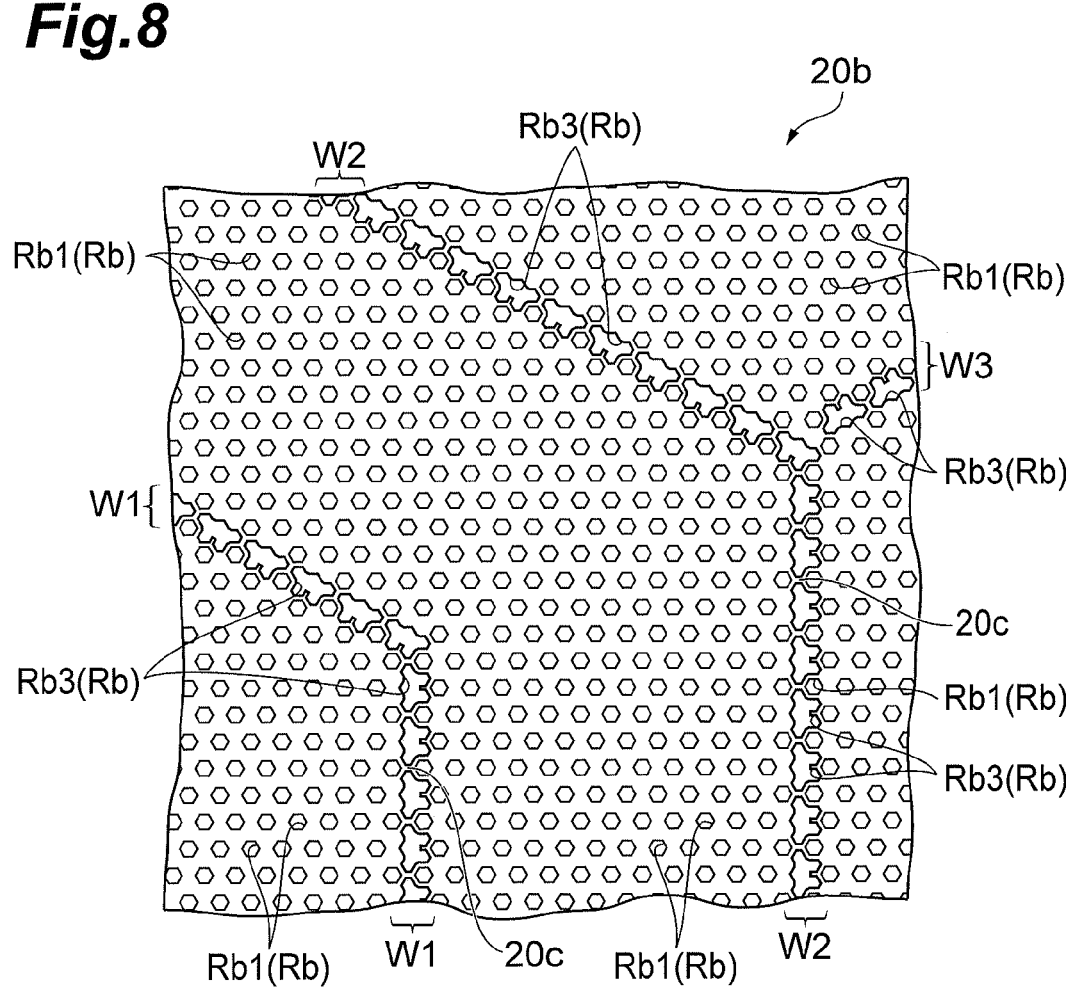
FIG. 8 is a partial enlarged view of FIG. 7.

FIG. 8 is a partial enlarged view of FIG. 7. As shown in FIG. 8, the first circular row W1 and the second circular row W2 are formed by arranging the second flow passages Rb3 adjoining and partitioned by the partition wall 20c in a circular pattern (regular hexagonal pattern). The first circular row W1 and the second circular row W2 include the second flow passages Rb3 of the second flow passages Rb which are opened at the side of the second end surface 20b.

The second flow passage Rb3 is a flow passage in which the opening area in the cross-section perpendicular to the central axis CL is larger compared to the opening area of the second flow passage Rb1. That is, in the cross-section perpendicular to the central axis CL, the opening area of the second flow passage Rb3 is larger than the opening area of the second flow passage Rb1. The second flow passage Rb3 has a cross-sectional shape formed by combining one second flow passage Rb1 and four second flow passages Rb2 around it, which are shown in FIG. 6. It is to be noted that the cross-sectional shape of the second flow passage Rb3 is not limited to that described above.

According to the above-described honeycomb structure 20 according to the second embodiment, just like the honeycomb structure 10 according to the first embodiment, generation of the circular crack can be induced to the first circular row W1 and the second circular row W2, decrease in filter performance due to generation of the circular crack can be suppressed. Moreover, by permitting the generation of the circular crack in the circular rows W1, W2, stress to be applied by subsequent thermal shock can be dispersed, and therefore, enlargement of the circular crack can be suppressed.

In addition, since the circular rows W1, W2 include the second flow passages Rb3 having a large opening area, the average of the opening area of the second flow passages Rb forming the circular rows W1, W2 becomes larger than the average of the opening area of the second flow passages Rb not forming the circular rows W1, W2. The average of the opening area of the second flow passages Rb forming the circular rows W1, W2 means the area average obtained by dividing the sum of the opening area of all of the second flow passages Rb in the circular rows W1, W2 by the number of the flow passages. In the same manner, the average of the opening area of the second flow passages Rb not forming the circular rows W1, W2 means the area average obtained by dividing the sum of the opening area of all of the second flow passages Rb not forming the circular rows W1, W2 by the number of the flow passages. Accordingly, in the honeycomb structure 20, the opening ratios of the circular rows W1, W2 become large and strength can be further reduced, and thus, generation of the circular crack can be induced more reliably.

Furthermore, the honeycomb structure 20 according to the second embodiment includes a plurality of flow passage rows W3 which are located radially with the central axis CL as the center. The flow passage rows W3 are formed to extend from respective vertexes of the regular hexagonal shape of the second circular row W2 toward the outer periphery of the honeycomb structure 20. In the same manner as the first circular row W1 and the second circular row W2, these flow passage rows W3 are also composed of the second flow passages Rb3 having a large opening area.

According to the honeycomb structure 20 having such a configuration, even if thermal shock of more than acceptable amount of the honeycomb structure 20 is applied and stress capable of generating a radial crack is applied during filter regeneration, a radial crack can be induced to be generated at the side of the second end surface 20b of the flow passage rows W3. In addition, in the honeycomb structure 20, since the side of a first end surface 20a of the flow passage rows W3 is completely plugged, if the radial crack is generated at the side of the second end surface 20b of the flow passage rows W3, soot leakage does not occur and decrease in filter performance due to generation of the radial crack can be suppressed. Moreover, by permitting the generation of the radial crack in the flow passage rows W3, stress to be applied by subsequent thermal shock can be dispersed, and therefore, enlargement of the radial crack can be suppressed.

Heretofore, the embodiments of the present invention have been described, but the present invention is not limited to the above-described respective embodiments. For example, the positions, the sizes, the shapes and the like of the circular rows W, W1, W2 and the flow passage rows W3 are not limited to those described above. The circular rows W, W1, W2 are not necessarily required to be formed with the central axis CL of the honeycomb structure 10 as the center, the central axis CL may be deviated from the center of the circular rows W, W1, W2, and the circular rows W, W1, W2 may be formed so as not to surround the central axis CL. The positions, the sizes, the shapes and the like of the circular rows W, W1, W2 and the flow passage rows W3 can be set in accordance with, for example, a region where a crack tends to be generated in various honeycomb structures.

Moreover, the cross-sectional shapes of the first flow passages Ra and the second flow passages Rb are not limited to those described above. Moreover, the cross-sectional structures of the honeycomb structures 10, 20 are not limited to the asymmetry cell structure and may be the symmetry cell structure composed of flow passages having the same cross-sectional shape. Furthermore, the honeycomb structures 10, 20 are not necessarily required to be formed by integral extrusion and may be formed into a segment structure.

INDUSTRIAL APPLICABILITY

The present invention can be applied as a honeycomb structure capable of suppressing decrease in filter performance due to generation of a circular crack and capable of suppressing enlargement of the circular crack.

REFERENCE SIGNS LIST 10, 20 . . . Honeycomb Structure, 10a, 20a . . . First End Surface, 10b, 20b . . . Second End Surface, 10c, 20c . . .

Partition Wall, 11 . . . Plugging Material, 12 . . . Plugging Material, CL . . . Central Axis, Ra . . . First Flow Passage, Rb . . . Second Flow Passage, Rb1 . . . Second Flow Passage (Regular Hexagonal Shape), Rb2 . . . Second Flow Passage (Orderly Hexagonal Shape), Rb3 . . . Second Flow Passage (Magnified Cross-Section), W, Wa to Wc . . . Circular Row, W1 . . . First Circular Row, W2 . . . Second Circular Row, W3 . . . Flow Passage Row

The invention claimed is:

1. A columnar honeycomb structure extending along a central axis, comprising:
a first end surface and a second end surface which are opposed to each other in an extending direction of the central axis; and
a partition wall forming a plurality of first flow passages and a plurality of second flow passages which extend along the central axis, wherein
the first flow passages are opened at a side of the first end surface and plugged at a side of the second end surface,
the second flow passages are plugged at the side of the first end surface and opened at the side of the second end surface,
an opening ratio of the first end surface is larger than an opening ratio of the second end surface,
a circular row formed by arranging the second flow passages adjoining and partitioned by the partition wall in a circular pattern without interposing the first flow passages when viewed from the extending direction of the central axis at the side of the second end surface,
regions except the circular row formed by arranging the first flow passages and the second flow passages adjoining and partitioned by the partition wall inside and outside of the circular row when viewed from the extending direction of the central axis at the side of the second end surface, and
wherein, in a cross-section perpendicular to the central axis, an average of an opening area of the second flow passages forming the circular row is larger than an average of an opening area of the second flow passages not forming the circular row in the regions except the circular row.

2. A columnar honeycomb structure extending along a central axis, comprising:
a first end surface and a second end surface which are opposed to each other in an extending direction of the central axis; and
a partition wall forming a plurality of first flow passages and a plurality of second flow passages which extend along the central axis, wherein
the first flow passages are opened at a side of the first end surface and plugged at a side of the second end surface,
the second flow passages are plugged at the side of the first end surface and opened at the side of the second end surface,
an opening ratio of the first end surface is larger than an opening ratio of the second end surface,
a circular row formed by arranging the second flow passages adjoining and partitioned by the partition wall in a circular pattern without interposing the first flow passages when viewed from the extending direction of the central axis at the side of the second end surface,
regions except the circular row formed by arranging the first flow passages and the second flow passages adjoining and partitioned by the partition wall inside and outside of the circular row when viewed from the extending direction of the central axis at the side of the second end surface, and
wherein, the circular row is formed by arranging a plurality of the circular rows adjacent to each other in parallel across the partition wall without interposing the first flow passages.

3. The honeycomb structure according to claim 1, wherein the circular row is formed so as to surround the central axis.

4. The honeycomb structure according to claim 2, wherein the circular row is formed so as to surround the central axis.

* * * * *